United States Patent
Kubo et al.

(10) Patent No.: US 7,546,478 B2
(45) Date of Patent: Jun. 9, 2009

(54) APPARATUS AND METHOD TO PROVIDE POWER TO A PLURALITY OF DATA STORAGE DEVICES DISPOSED IN A DATA STORAGE SYSTEM

(75) Inventors: Robert Akira Kubo, Tucson, AZ (US); Gregg Steven Lucas, Tucson, AZ (US); Tohru Sumiyoshi, Yokohama (JP); Yoshihiko Terashita, Yamato (JP)

(73) Assignee: International Business Machines Corporation, Armonk, NY (US)

(*) Notice: Subject to any disclaimer, the term of this patent is extended or adjusted under 35 U.S.C. 154(b) by 494 days.

(21) Appl. No.: 11/351,792

(22) Filed: Feb. 10, 2006

(65) Prior Publication Data

US 2007/0192637 A1    Aug. 16, 2007

(51) Int. Cl.
G06F 1/00          (2006.01)
G06F 15/177        (2006.01)

(52) U.S. Cl. .................. 713/330; 713/1; 713/300; 710/10

(58) Field of Classification Search ............... 713/1, 713/2, 100, 300, 330; 710/10
See application file for complete search history.

(56) References Cited

U.S. PATENT DOCUMENTS

| 6,233,625 | B1 * | 5/2001 | Vander Kamp et al. ........ 710/10 |
| 6,408,394 | B1 * | 6/2002 | Vander Kamp et al. ....... 713/300 |
| 6,668,305 | B1 * | 12/2003 | Henriquez ................... 711/112 |
| 6,965,956 | B1 * | 11/2005 | Herz et al. ..................... 710/74 |
| 6,966,006 | B2 * | 11/2005 | Pacheco et al. ............. 713/300 |
| 7,305,572 | B1 * | 12/2007 | Burroughs et al. .......... 713/300 |
| 7,370,220 | B1 * | 5/2008 | Nguyen et al. .............. 713/330 |

FOREIGN PATENT DOCUMENTS

TW              247467          3/2004

* cited by examiner

Primary Examiner—Mark Connolly
(74) Attorney, Agent, or Firm—Dale F. Regelman; Quarles & Brady LLP (57) ABSTRACT

A method is disclosed to provide power to a plurality of data storage devices disposed in a data storage system. The data storage system comprises a system controller comprising a data storage device power-up algorithm and a plurality of data storage devices, where each of the plurality of data storage devices cannot automatically provide a device present signal. The method detects the presence of each of the plurality of data storage devices, and then provides power to each of the detected data storage devices using the data storage device power-up algorithm.

6 Claims, 9 Drawing Sheets

APPARATUS AND METHOD TO PROVIDE POWER TO A PLURALITY OF DATA STORAGE DEVICES DISPOSED IN A DATA STORAGE SYSTEM

FIELD OF THE INVENTION

This invention relates to an apparatus and method to provide power to a plurality of data storage devices disposed in a data storage system.

BACKGROUND OF THE INVENTION

Data storage systems are used to store information provided by one or more host computer systems. Such data storage systems receive requests to write information to a plurality of data storage devices, and requests to retrieve information from that plurality of data storage devices.

In certain embodiments, each of the data storage devices cannot automatically provide a "device present" signal. Using such data storage devices, prior art methods must power up all the data storage devices that might be present, and then discover the data storage devices actual present. In order to prevent deleterious power surges, the prior art methods sequentially provide power to groupings comprising all of the potential data storage disks. Such sequencing or staggering of the data storage device power on process over all potentially present data storage devices requires an increased time with respect to powering on groupings of data storage devices actually known to be disposed in the storage system What is needed is an apparatus and method to first detect the plurality of data storage devices actually disposed in a data storage system, and then powering up those detected data storage devices.

SUMMARY OF THE INVENTION

Applicants' invention comprises a method to provide power to a plurality of data storage devices disposed in a data storage system. Applicants' data storage system comprises a system controller comprising a data storage device power-up algorithm and a plurality of data storage devices, where each of the plurality of data storage devices cannot automatically provide a device present signal. Applicants' method detects the presence of each of the plurality of data storage devices, and then provides power to each of the detected data storage devices using the data storage device power-up algorithm.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. The invention will be described as embodied in a data storage system which comprises two clusters, each cluster comprising a plurality of device adapters and a data cache. The following description of Applicants' method is not meant, however, to limit Applicants' invention to storage systems comprising multiple clusters, as the invention herein can be generally applied to detecting and powering up a plurality of data storage devices disposed in a data storage system.

Figure 1:
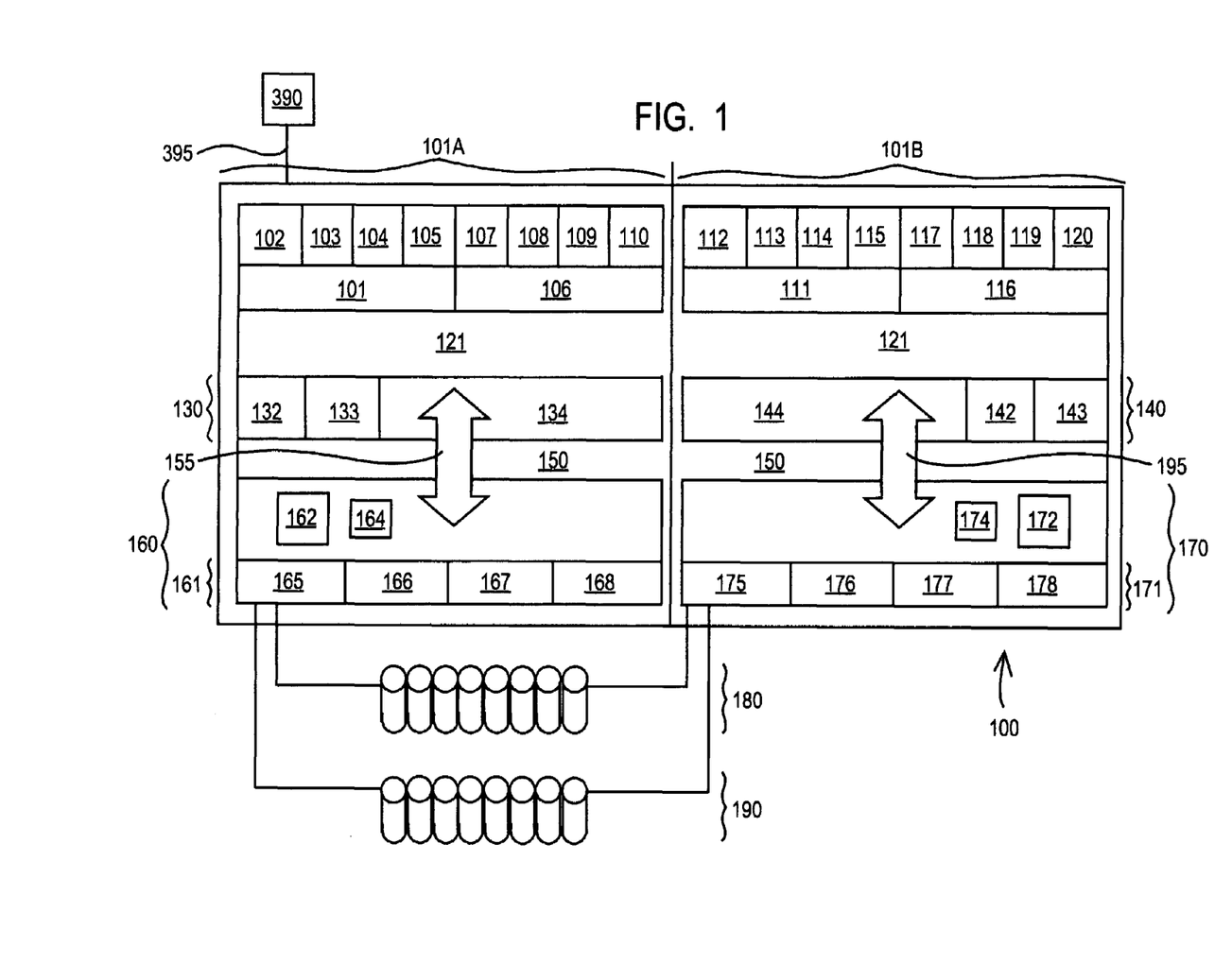
FIG. 1 is a block diagram showing one embodiment of Applicants' data storage system.

Referring now to FIG. 1, data storage system 100 is capable of communication with host computer 390 via communication link 395. The illustrated embodiment of FIG. 1 shows a single host computer. In other embodiments, Applicants' data storage system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, host computer 390 further includes a storage management program. The storage management program in the host computer 390 may include the functionality of storage management type programs known in the art that manage the transfer of data to and from a data storage system, such as the IBM DFSMS implemented in the IBM MVS operating system.

In certain embodiments, Applicants' data storage system includes a plurality of host adapters. In the illustrated embodiment of FIG. 1, system 100 comprises host adapters 102-105, 107-110, 112-115 and 117-120. In other embodiments, Applicants' data storage system includes fewer than 16 host adapters. In still other embodiments, Applicants' data storage system includes more than 16 host adapters. In certain embodiments, one or more of the host adapters are multi-ported. Regardless of the number of host adapters disposed in any embodiments of Applicants' system, each of those host adapters comprises a shared resource that has equal access to both central processing/cache elements 130 and 140.

Each host adapter may comprise one or more Fibre Channel ports, one or more FICON ports, one or more ESCON ports, or one or more SCSI ports, one or more SAS ports, and the like. Each host adapter is connected to both clusters through interconnect bus 121 such that each cluster can handle I/O from any host adapter. Internal buses in each subsystem are connected via a Remote I/O bridge 155/195 between the processor portions 130/140 and I/O portions 160/170, respectively.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters 161 which in the illustrated embodiment of FIG. 1 comprises device adapters 165, 166, 167, and 168. I/O portion 160 further comprise nonvolatile storage ("NVS") 162 and battery backup 164 for NVS 162.

I/O portion 170 comprises a plurality of device adapters 171 which in the illustrated embodiment of FIG. 1 comprises device adapters 175, 176, 177, and 178. I/O portion 170 further comprises nonvolatile storage ("NVS") 172 and battery backup 174 for NVS 172.

In certain embodiments of Applicants' system, one or more host adapters, processor portion 130, and one or more device adapters are disposed on a first control card disposed in Applicants' data storage system. Similarly, in certain embodiments, one or more host adapters, processor portion 140, one or more device adapters are disposed on a second control card disposed in Applicants' data storage system.

In the illustrated embodiment of FIG. 1, sixteen data storage devices are organized into two arrays, namely array 180 and array 190. The illustrated embodiment of FIG. 1 shows two storage device arrays.

In certain embodiments, one or more of the data storage devices comprise a plurality of hard disk drive units. In certain embodiments, arrays 180 and 190 utilize a RAID protocol. In certain embodiments, arrays 180 and 190 comprise what is sometimes called a JBOD array, i.e. "Just a Bunch Of Disks" where the array is not configured according to RAID. In certain embodiments, arrays 180 and 190 comprise what is sometimes called an SBOD array, i.e. "Switched Bunch Of Disks".

The illustrated embodiment of FIG. 1 shows two storage device arrays. In other embodiments, Applicants' system includes a single storage device array. In yet other embodiments, Applicants' system includes more than two storage device arrays.

Figure 2A:
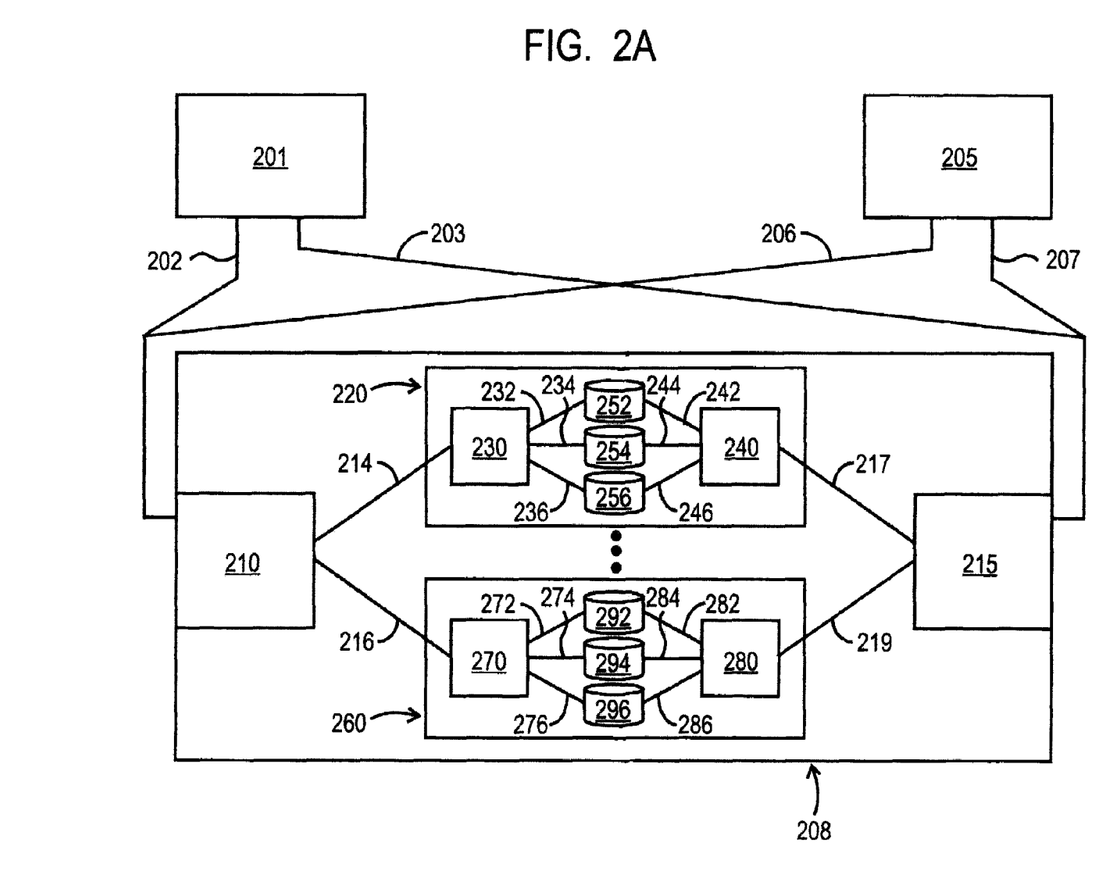
FIG. 2A is a block diagram showing two system controllers in communication with a first embodiment of Applicants' data storage device enclosure comprising two local controllers, two repeaters, and a plurality of data storage devices.

Referring now to FIG. 2A, in certain embodiments Applicants' data storage system comprises system controller 201 and system controller 205. In certain embodiments, controller 201 comprises a RAID controller. In certain embodiments, controller 201 comprises an initiator. In certain embodiments, controller 201 comprises processor 132, memory 133, one or more host adapter ports 101, and one or more device adapter ports 161. In certain embodiments, controller 205 comprises a RAID controller. In certain embodiments, controller 205 comprises an initiator. In certain embodiments, controller 205 comprises processor 142, memory 143, one or more host adapter ports 111, and one or more device adapter ports 171.

Figure 2B:
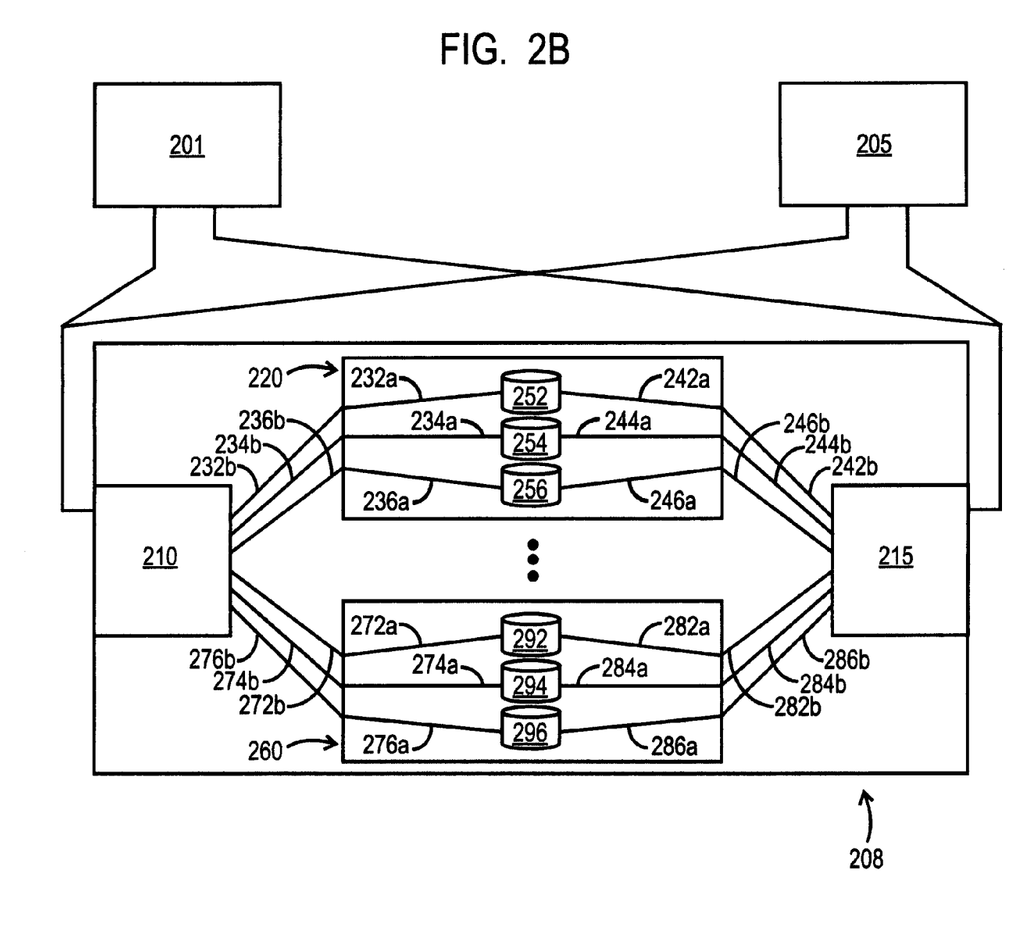
FIG. 2B is a block diagram showing two system controllers in communication with a second embodiment of Applicants' data storage device enclosure comprising two local controllers and a plurality of data storage devices.

In the illustrated embodiments of FIGS. 2A and 2B, data storage device enclosure 208 comprises local controller 210, local controller 215, data storage device assembly 220, and data storage device assembly 260. In certain embodiments, data storage device enclosure 208 comprises an SBOD storage array, such as storage array 180 (FIG. 1). In other embodiments, data storage device enclosure 208 comprises a RAID storage array, such as storage array 180.

System controller 201 communicates bidirectionally with local controller 210 via communication link 202. System controller 201 communicates bidirectionally with local controller 215 via communication link 203. System controller 205 communicates bidirectionally with local controller 210 via communication link 206. System controller 205 communicates bidirectionally with local controller 215 via communication link 207.

In the illustrated embodiments of FIGS. 2A and 2B, data storage device enclosure 208 comprises two data storage device assemblies, namely data storage device assembly 220 and data storage device assembly 260. As a general matter, data storage device enclosure 208 comprises (M) data storage device assemblies, wherein (M) is greater than or equal to 2. In certain embodiments, (M) is 2. In other embodiments, (M) is 3. In yet other embodiments, (M) is 4. In still other embodiments, (M) is greater than 4.

In the illustrated embodiment of FIG. 2A, data storage device assembly 220 comprises repeater 230, repeater 240, and data storage devices 252, 254, and 256. As a general matter, data storage device assembly 220 comprises (N) data storage devices, wherein (N) is greater than or equal to 2. Repeater 230 communicates bidirectionally with data storage device 252, 254, and 256, via data storage device communication links 232, 234, and 236, respectively. Repeater 240 communicates bidirectionally with data storage device 252, 254, and 256, via data storage device communication links 242, 244, and 246, respectively. In the illustrated embodiment of FIG. 2A, data storage device assembly 260 comprises repeater 270, repeater 280, and data storage devices 292, 294, and 296. Repeaters 230, 240, 270, and 280, redrive SAS signals.

As a general matter, data storage device assembly 260 comprises (N) data storage devices, wherein (N) is greater than or equal to 2. Repeater 270 communicates bidirectionally with data storage device 292, 294, and 296, via data storage device communication links 272, 274, and 276, respectively. Repeater 280 communicates bidirectionally with data storage device 272, 274, and 276, via data storage device communication links 282, 284, and 286, respectively. Local controller 210 communicates bidirectionally with repeater 230 via local controller communication link 214. Local controller 210 communicates bidirectionally with repeater 270 via local controller communication link 216. Local controller 215 communicates bidirectionally with repeater 240 via local controller communication link 217. Local controller 215 communicates bidirectionally with repeater 280 via local controller communication link 219.

In the illustrated embodiment of FIG. 2B, data storage device assembly 220 comprises data storage devices 252, 254, and 256. Local controller 210 communicates with data storage device 252 via communication links 232a and 232b. Local controller 210 communicates with data storage device 254 via communication links 234a and 234b. Local controller 210 communicates with data storage device 256 via communication links 236a and 236b. Local controller 215 communicates with data storage device 252 via communication links 242a and 242b. Local controller 215 communicates with data storage device 254 via communication links 244a and 244b. Local controller 215 communicates with data storage device 256 via communication links 246a and 246b.

In the illustrated embodiment of FIG. 2B, data storage device assembly 260 comprises data storage devices 292, 294, and 296. Local controller 210 communicates with data storage device 292 via communication links 272a and 272b. Local controller 210 communicates with data storage device 294 via communication links 274a and 274b. Local controller 210 communicates with data storage device 296 via communication links 276a and 276b. Local controller 215 communicates with data storage device 292 via communication links 282a and 282b. Local controller 215 communicates with data storage device 294 via communication links 284a and 284b. Local controller 215 communicates with data storage device 296 via communication links 286a and 286b.

Figure 2C:
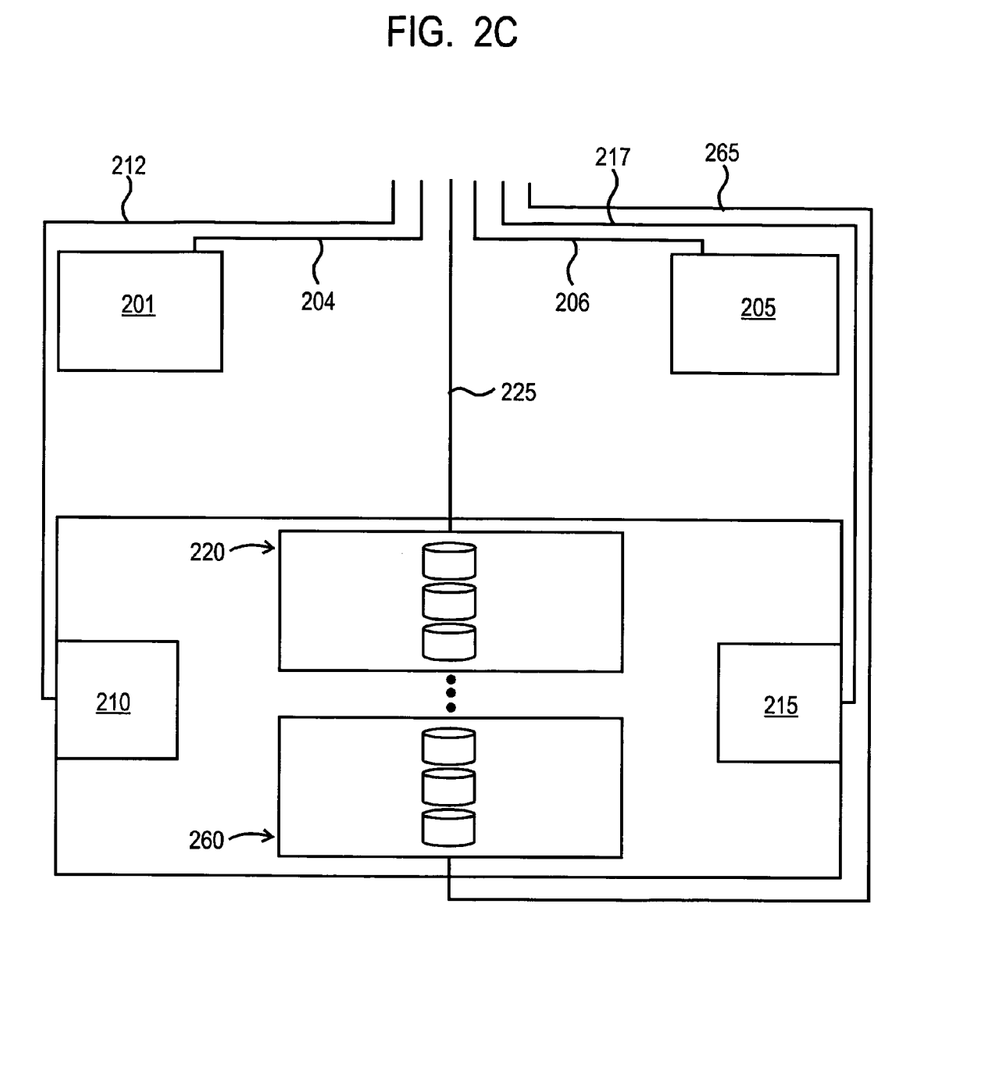
FIG. 2C is a block diagram showing various power buses disposed in the apparatus of FIGS. 2A and 2B.

FIG. 2C shows the power buses utilized to provide power to system controller 201, system controller 205, local controller 210, local controller 215, data storage device assembly 220, and data storage device assembly 260. In the illustrated embodiment of FIG. 2C, power bus 204 provides power to system controller 201, and power bus 206 provides power to system controller 205. In certain embodiments, power bus 204 and 206 are the same.

In the illustrated embodiment of FIG. 2C, power bus 212 provides power to local controller 210, and power bus 217 provides power to local controller 215. In certain embodiments, power bus 212 and 217 are the same. In the illustrated embodiment of FIG. 2B, power bus 225 provides power to data storage device assembly 220, and power bus 265 provides power to data storage device assembly 260.

In certain embodiments, power bus 225 and 265 are the same. In certain embodiments, power bus 225 comprises a plurality of power buses, wherein a different power bus provides power to each of the data storage devices disposed within assembly 220. Similarly, in certain embodiments, power bus 265 comprises a plurality of power buses, wherein a different power bus provides power to each of the data storage devices disposed within assembly 260.

In certain embodiments Applicants' data storage system comprises more than one disclosure enclosure 208. For example in the illustrated embodiment of FIG. 3, Applicants' data storage system comprises two data storage device enclosures 208, namely data storage device enclosure 208A and data storage device enclosure 208B. Local controller 210A communicates bidirectionally with local controller 210B via communication link 310. Local controller 215A communicates bidirectionally with local controller 215B via communication link 320.

Applicants' invention comprises an apparatus and a method to detect the presence of data storage devices disposed in Applicants' data storage system prior to providing full power to the one or more system controllers, such as system controller 210 and system controller 215. In certain embodiments, Applicants' apparatus and method utilize optical methods to determine the presence of data storage devices disposed in Applicants' data storage system. For example and referring now to FIG. 4A, repeater 230 comprises radiation emitting devices 410, 430, and 450. Repeater 240 comprises radiation detecting devices 420, 440, and 460.

Figure 4A:
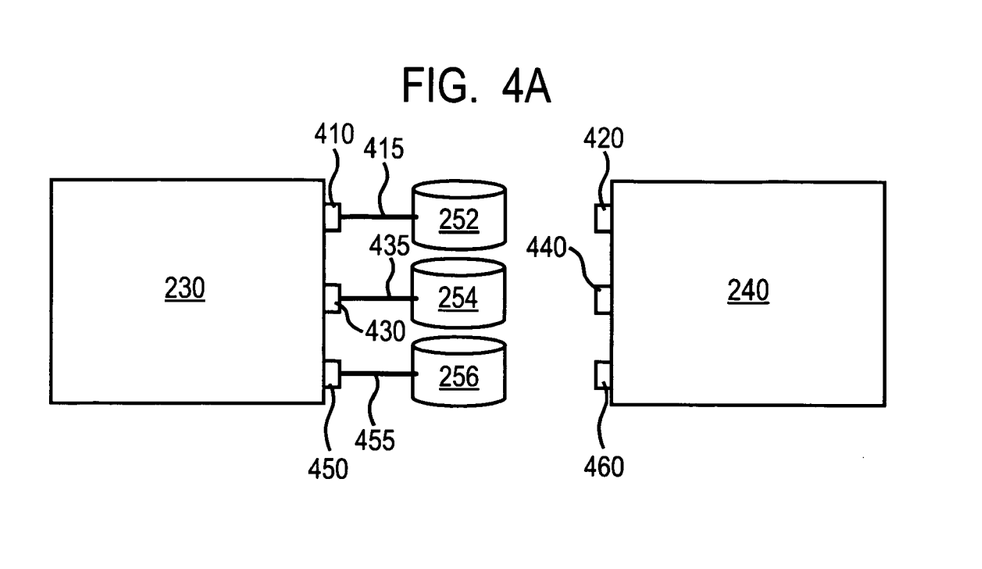
FIG. 4A is a block diagram showing a portion of the data storage device enclosure of FIG. 2A comprising three radiation emitting devices, three emitted beams, and three radiation emitting detecting devices, wherein a different data storage device blocks each of the three emitted beams.

In certain embodiments, radiation emitting devices 410, 430, and 450, emit, and radiation detecting devices 420, 440, and 460, detect infrared radiation. In certain embodiments, radiation emitting devices 410, 430, and 450, emit, and radiation detecting devices 420, 440, and 460, detect light in the visible spectrum. In certain embodiments, radiation emitting devices 410, 430, and 450, comprise GaAs diode lasers emitting radiation comprising a wavelength of about 840 nm, and radiation detecting devices 420, 440, and 460, detect radiation comprising a wavelength of about 840 nm. In certain embodiments, radiation emitting devices 410, 430, and 450, comprise AlGaAs diode lasers emitting radiation comprising a wavelength of about 760 nm, and radiation detecting devices 420, 440, and 460, detect radiation comprising a wavelength of about 760 nm. In certain embodiments, radiation emitting devices 410, 430, and 450, comprise GaInAsP diode lasers emitting radiation comprising a wavelength of about 1300 nm, and radiation detecting devices 420, 440, and 460, detect radiation comprising a wavelength of about 1300 nm.

In the illustrated embodiment of FIG. 4A, radiation emitting device 410 emits beam 415. Data storage device 252 blocks beam 415 such that radiation detecting device 420 does not detect beam 415. The failure of radiation detecting device 420 to detect beam 415 causes repeater 240 to provide a data storage device present signal to local controller 215 regarding data storage device 252. Local controller 215 then provides a data storage device present signal to system controllers 201 and 205 regarding data storage device 252. Data storage device 254 blocks beam 435 such that radiation detecting device 440 does not detect beam 435. The failure of radiation detecting device 440 to detect beam 435 causes repeater 240 to provide a data storage device present signal to local controller 215 regarding data storage device 254. Local controller 215 then provides a data storage device present signal to system controllers 201 and 205 regarding data storage device 254. Data storage device 256 blocks beam 455 such that radiation detecting device 460 does not detect beam 455. The failure of radiation detecting device 460 to detect beam 455 causes repeater 240 to provide a data storage device present signal to local controller 215 regarding data storage device 256. Local controller 215 then provides a data storage device present signal to system controllers 201 and 205 regarding data storage device 256.

Figure 4B:
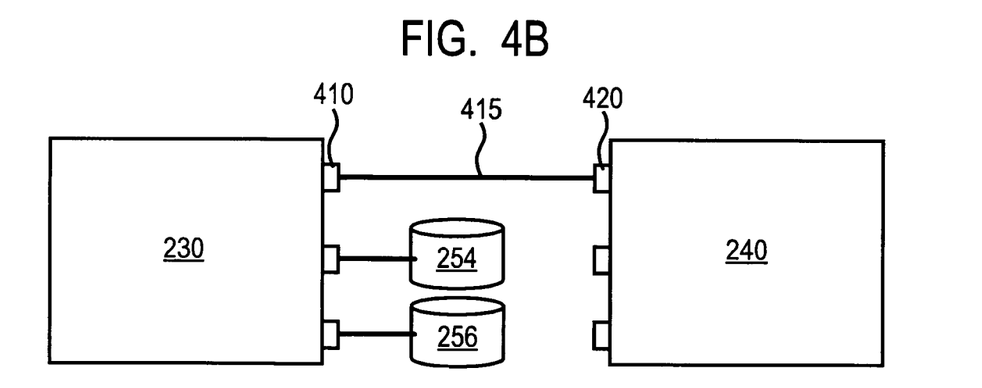
FIG. 4B is the block diagram of FIG. 4A wherein two data storage devices block two of the emitted beams, and wherein a third emitted beam is detected by a radiation detecting device.

Referring to FIG. 4B, radiation emitting device 410 emits beam 415 which is detected by radiation detector 420. Because radiation detecting device 420 detects beam 415, repeater 240 does not provide a data storage device present signal to local controller 215 regarding data storage device 252. Local controller 215 does not provide a data storage device present signal to system controllers 201 and 205 regarding data storage device 252.

Figure 4C:
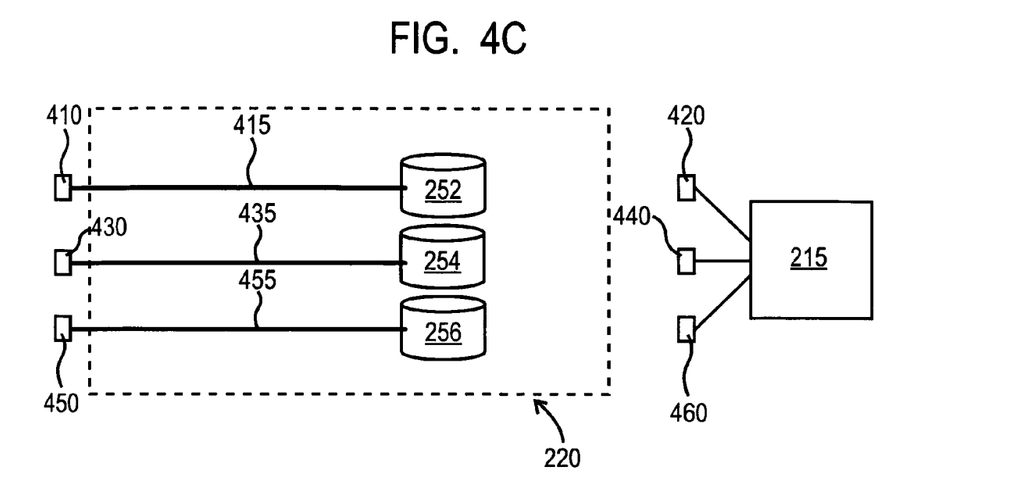
FIG. 4C is a block diagram showing a portion of the data storage device enclosure of FIG. 2B comprising three radiation emitting devices, three emitted beams, and three radiation emitting detecting devices, wherein a different data storage device blocks each of the three emitted beams.

In the illustrated embodiment of FIG. 4C, radiation emitting devices 410, 430, and 450, are disposed within enclosure 208 (FIGS. 2A, 2B) but external to assembly 220. Radiation detecting devices 420, 440, and 460, are disposed within enclosure 208 (FIGS. 2A, 2B) but external to assembly 220.

In the illustrated embodiment of FIG. 4C, radiation emitting device 410 emits beam 415. Data storage device 252 blocks beam 415 such that radiation detecting device 420 does not detect beam 415. The failure of radiation detecting device 420 to detect beam 415 causes local controller 215 to provide a data storage device present signal to system controllers 201 and 205 regarding data storage device 252. Data storage device 254 blocks beam 435 such that radiation detecting device 440 does not detect beam 435. The failure of radiation detecting device 440 to detect beam 435 causes local controller 215 to provide a data storage device present signal to system controllers 201 and 205 regarding data storage device 254. Data storage device 256 blocks beam 455 such that radiation detecting device 460 does not detect beam 455. The failure of radiation detecting device 460 to detect beam 455 causes local controller 215 to provide a data storage device present signal to system controllers 201 and 205 regarding data storage device 256.

Figure 4D:
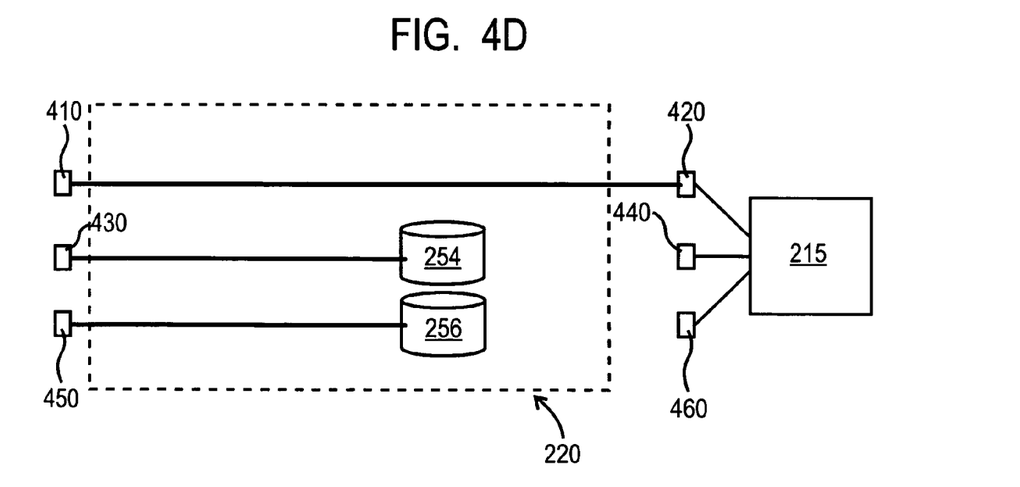
FIG. 4D is the block diagram of FIG. 4C wherein two data storage devices block two of the emitted beams, and wherein a third emitted beam is detected by a radiation detecting device.

Referring to FIG. 4D, radiation emitting device 410 emits beam 415 which is detected by radiation detector 420. Because radiation detecting device 420 detects beam 415, local controller 215 does not provide a data storage device present signal to system controllers 201 and 205 regarding data storage device 252.

In certain embodiments, Applicants' apparatus and method utilize radio frequency identification ("RFID") technology to determine the presence of data storage devices in Applicants' data storage system. For example and referring to FIG. 5, data storage device 252 comprises RFID circuit 520, sometimes referred to as an "RFID tag," and local controller 210 comprises RFID reader 510. In the illustrated embodiment of FIG. 5, local controller 215 comprises RFID reader 515. RFID reader 510 and/or RFID reader 515 transmits a radio frequency signal which interrogates RFID tag 520.

Figure 5:
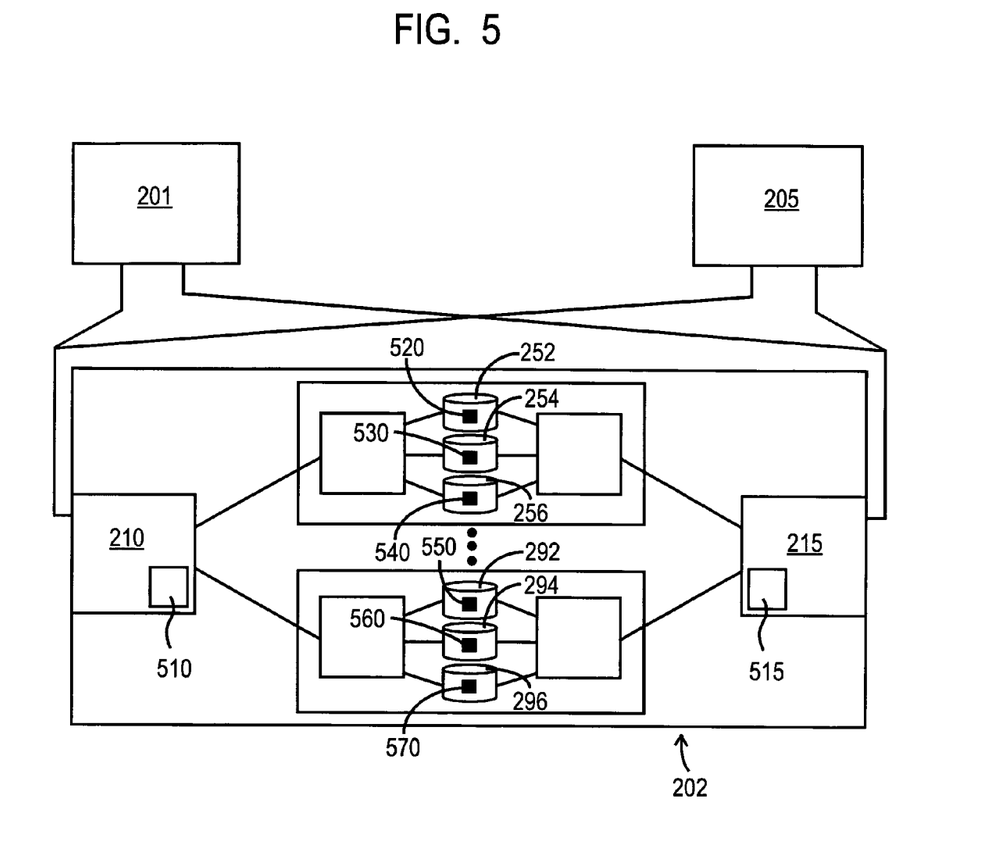
FIG. 5 is a block diagram showing a portion of the data storage device enclosure of FIG. 2A, wherein each data storage device comprises an RFID tag and wherein each of the two local controllers comprises an RFID reader.

In certain embodiments, RFID tag 520 comprises no internal power supply. An electrical current is by an incoming radio frequency signal, and provides sufficient power for RFID tag 520 to power up and transmit a response comprising a unique identifier assigned to data storage device 252. In certain embodiments, RFID tag 520 backscatters the carrier signal from the reader. RFID reader 510 and/or RFID reader 515 receives the RFID tag response comprising the unique identifier assigned to data storage device 252. Local controller 210 and/or local controller 215 then provides a data storage device presence signal to system controllers 201 and 205 regarding data storage device 252.

Similarly, data storage devices 254, 256, 292, 294, 296, comprise RFID tags 530, 540, 550, 560, and 570, respectively, which upon interrogation by RFID reader 510 and/or 515 respond with a signal comprising a unique identifier associated with data storage device 254, 256, 292, 294, and/or 296, respectively. Upon detecting those RFID tag responses, local controller 210 and/or local controller 215 provide data storage device present signals to system controllers 201 and 205.

In still other embodiments, Applicants' data storage device enclosure 208 (FIGS. 2A, 2B) comprises a plurality of microswitches, wherein each data storage device disposed in the data storage device enclosure mechanically closes a microswitch, thereby providing a "device present" signal to each local controller disposed in that data storage device enclosure. In yet other embodiments, Applicants' data storage device enclosure 208 (FIGS. 2A, 2B) comprises a plurality of Hall sensors, wherein the presence of each data storage device activates an associated Hall sensor, thereby providing a "device present" signal to each local controller disposed in that data storage device enclosure.

Applicants' invention comprises a method to detect a plurality of data storage devices disposed in a data storage system, where none of those data storage devices automatically provides a "device present" signal. In certain embodiments, the plurality of data storage devices each comprise an SAS or a SATA hard disk drive.

Figure 6:
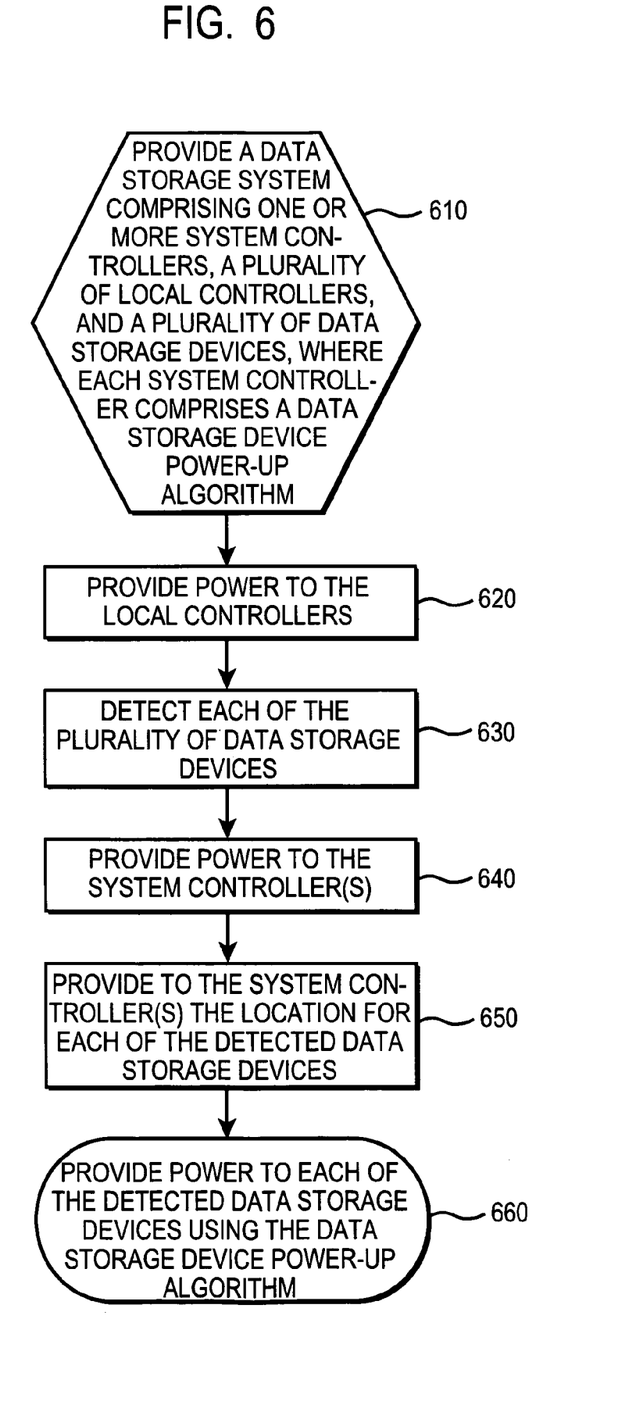
FIG. 6 is a flow chart summarizing the steps of Applicants' method.

FIG. 6 summarizes the steps of Applicants' method. Referring now to FIG. 6, in step 610 Applicants' method provides a data storage system comprising one or more system controllers, a plurality of local controllers, and a plurality of data storage devices. Each of the one or more system controllers comprises a data storage device power-up algorithm. In order to maintain nominal power supply regulation, a system controller must sequence power to groups of data storage devices to prevent undesirable surge currents. Using Applicants' method, the one or more system controllers receive device present signals from a plurality of local controllers, wherein those device present signals comprise the identifiers for, and the locations of, each data storage device disposed in the data storage system.

The one or more system controllers receive such device present signals prior to powering up the plurality of data storage devices. Based upon the locations of the detected data storage devices, and using the data storage device power-up algorithm, the one or more system controllers can power on each of the detected data storage devices in a minimum aggregate time, thereby reducing the power-up/boot-up time for Applicants' data storage system while maintaining the power system regulation requirements.

In certain embodiments, the one or more system controllers are interconnected with one or more first power buses, such as for example power bus 204 (FIG. 2B) and/or power bus 206 (FIG. 2B). In certain embodiments, the plurality of local controllers are interconnected with one or more second power buses, such as for example power bus 212 (FIG. 2B) and/or power bus 217 (FIG. 2B). In certain embodiments, the plurality of data storage devices are interconnected with one or more third power buses, such as for example power bus 225 (FIG. 2B) and/or power bus 265 (FIG. 2B).

Figure 3:
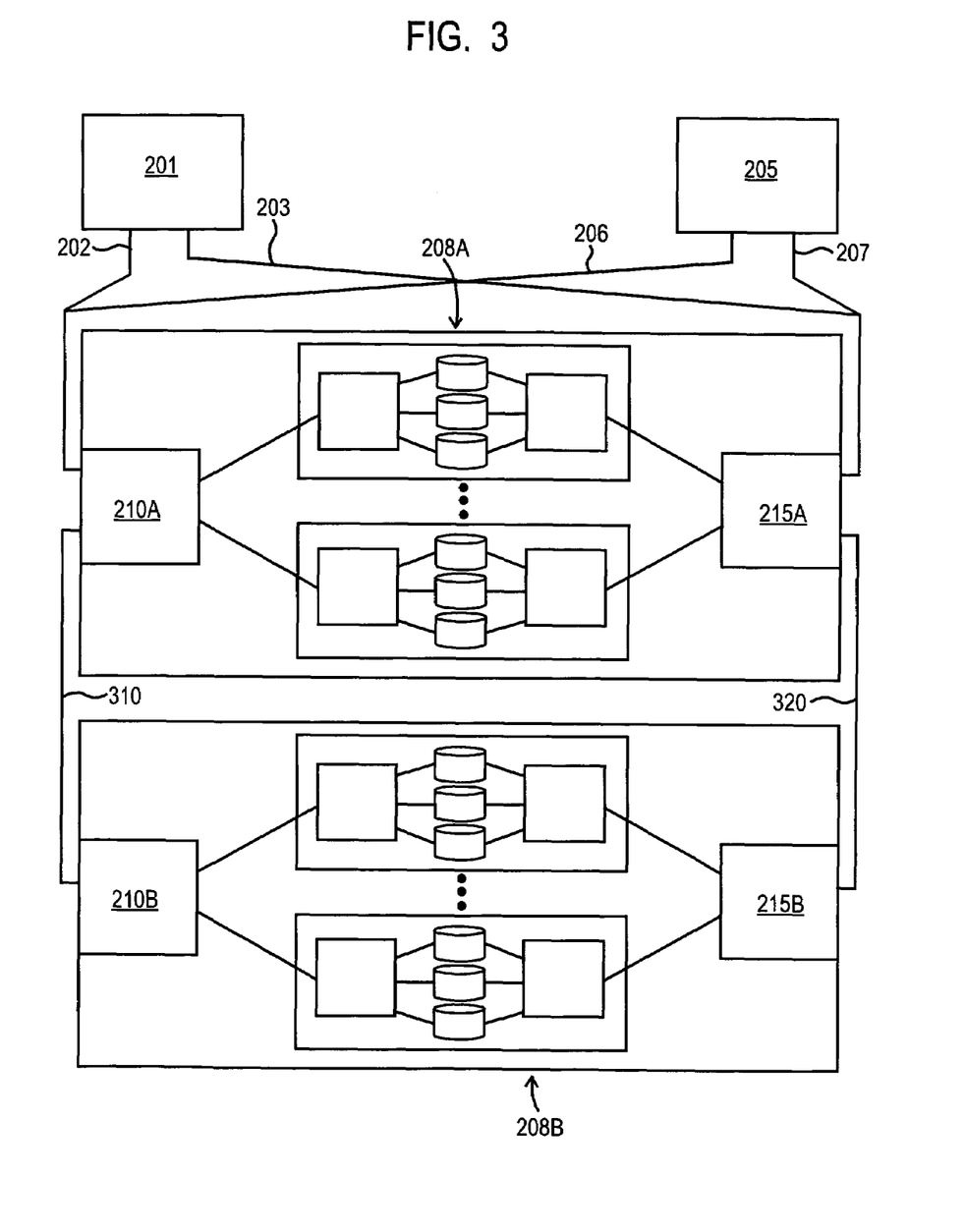
FIG. 3 is a block diagram showing two system controllers in communication with two data storage device enclosures.

In step 620, Applicants' method provides power to the plurality of local controllers, such as local controllers 210 (FIGS. 2A, 2B), 210A (FIG. 3), 210B (FIG. 3), 215 (FIGS. 2A, 2B), 215A (FIG. 3), and/or 215B (FIG. 3). In certain embodiments, step 620 comprises first power to the plurality of local controllers, wherein that first power is less than full power. In certain embodiments, step 620 is performed prior to providing power to the one or more system controllers. In certain embodiments, step 620 is performed prior to providing power to the plurality of data storage devices.

In step 630, each local controller detects the presence of each data storage device disposed in the same data storage device enclosure. For example and referring to FIG. 2A, in step 630, both local controller 210 and local controller 215 detect data storage devices 252, 254, 256, 292, 294, and 296. In certain embodiments, step 630 further comprises detecting data storage devices using optical apparatus and methods as described hereinabove with reference to FIGS. 4A and 4B. In other embodiments, step 630 further comprises detecting data storage devices using RFID apparatus and methods as described hereinabove with reference to FIG. 5.

In still other embodiments, step 630 further comprises detecting data storage devices using a plurality of microswitches disposed in each data storage device enclosure, wherein each data storage device disposed in the data storage device enclosure mechanically closes a microswitch, thereby providing a "device present" signal to each local controller disposed in that data storage device enclosure. In yet other embodiments, step 630 further comprises detecting data storage devices using a plurality of Hall sensors disposed in each data storage device enclosure, wherein the presence of each data storage device activates an associated Hall sensor, thereby providing a "device present" signal to each local controller disposed in that data storage device enclosure.

Applicants' method transitions from step 630 to step 640 wherein the method provides power to the one or more system controllers. In certain embodiments, step 640 comprises providing first power to the one or more system controllers, wherein that first power is less than full power. Step 640 further comprises booting up the one or more system controllers.

Applicants' method transitions from step 640 to step 650 wherein each local controller provides a data storage device status to the one or more system controllers. In certain embodiments, the data storage device status comprises the identifier and location of each data storage device detected in step 630. In certain embodiments, step 650 further comprises requesting by the one or more system controllers a data storage device status from each of the local controllers.

Applicants' method transitions from step 650 to step 660 wherein Applicants' method provides power to each of the plurality of data storage devices disposed in Applicants' data storage system in an algorithmic sequence to minimize the time required to power up all the data storage devices while maintaining power supply regulation. In certain embodiments, the plurality of data storage devices are powered-up using the data storage device power-up algorithm disposed in each of the one or more system controllers.

In certain embodiments, step 660 further comprises providing power sequentially to groups of data storage devices. In certain embodiments, in step 660 the one or more system controllers provide instructions to the plurality of local controllers to provide power sequentially to groupings of data storage devices.

In certain embodiments, individual steps recited in FIG. 6 may be combined, eliminated, or reordered.

In certain embodiments, Applicants' invention includes instructions residing memory 133 (FIG. 1) and/or memory 143 (FIG. 1), where those instructions are executed by a processor, such as processor 132 (FIGS. 1, 2) and/or 142 (FIGS. 1, 2), respectively, to perform one or more of steps 620, 630, 640, 650, and/or 660 recited in FIG. 6.

In other embodiments, Applicants' invention includes instructions residing in any other computer program product, where those instructions are executed by a computer external to, or internal to, system 100, to perform one or more of steps 620, 630, 640, 650, and/or 660 recited in FIG. 6. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to provide power to a plurality of data storage devices disposed in a data storage system, comprising the steps of:

providing a data storage system comprising a system controller comprising a data storage device power-up algorithm, a plurality of local controllers, and a plurality of data storage devices, a data storage device assembly wherein said data storage device assembly comprises two or more data storage devices, a local controller wherein said local controller bidirectionally communicates with said system controller and wherein said local controller bidirectionally communicates with said data storage device assembly, wherein each of the plurality of data storage devices cannot automatically provide a device present signal;

detecting the presence of each of said plurality of data storage devices;

providing power to each of said plurality of data storage devices using said data storage device power-up algorithm;

providing power to said local controller prior to said detecting step, wherein said detecting step is performed by said local controller;

providing full power to said system controller after said detecting step;

providing by said local controller to said system controller a data storage device present signal for each of said detected data storage devices.

2. The method of claim 1, wherein said providing a local controller step further comprises providing a local controller comprising an RFID reader, and wherein said providing a plurality of data storage devices step further comprises providing a plurality of data storage device each comprising an RFID tag encoded with a unique identifier, further comprising the steps of:

interrogating said plurality of RFID tags using a radio frequency signal emitted by said RFID reader;

responding to said radio frequency signal by each of said plurality of data storage devices with a signal comprising that device's unique identifier.

3. An article of manufacture comprising a computer useable medium having computer readable program code disposed therein to provide power to a plurality of data storage devices disposed in a data storage system comprising a system controller comprising a data storage device power-up algorithm, and a plurality of data storage devices, a data storage device assembly wherein said data storage device assembly comprises two or more data storage devices, a local controller wherein said local controller bidirectionally communicates with said system controller and wherein said local controller bidirectionally communicates with said data storage device assembly, wherein each of the plurality of data storage devices cannot automatically provide a device present signal, the computer readable program code comprising a series of computer readable program steps to effect:

detecting the presence of each of said plurality of data storage devices;

providing power to each of said plurality of data storage devices using said data storage device power-up algorithm;

providing power to said local controller prior to said detecting step, wherein said detecting step is performed by said local controller;

providing full power to said system controller after said detecting step;

providing by said local controller to said system controller a data storage device present signal for each of said detected data storage devices.

4. The article of manufacture of claim 3, wherein said local controller further comprises an RFID reader, and wherein said plurality of data storage devices each comprises an RFID tag encoded with a unique identifier, said computer readable program code further comprising a series of computer readable program steps to effect:

interrogating said plurality of RFID tags using a radio frequency signal emitted by said RFID reader;

receiving a response signal from each of said plurality of data storage devices comprising that device's unique identifier.

5. A computer program product encoded in an information storage medium and usable with a programmable computer processor to provide power to a plurality of data storage devices disposed in a data storage system comprising a system controller comprising a data storage device power-up algorithm, and a plurality of data storage devices, a data storage device assembly wherein said data storage device assembly comprises two or more data storage devices, a local controller wherein said local controller bidirectionally communicates with said system controller and wherein said local controller bidirectionally communicates with said data storage device assembly, wherein each of the plurality of data storage devices cannot automatically provide a device present signal, the computer readable program code comprising a series of computer readable program steps to effect:

computer readable program code which causes said programmable computer processor to detect the presence of each of said plurality of plurality of data storage devices;

computer readable program code which causes said programmable computer processor to provide power to each of said plurality of data storage devices using said data storage device power-up algorithm;

computer readable program code which causes said programmable computer processor to provide power to said local controller prior to said detecting step;

computer readable program code which causes said programmable computer processor to provide full power to said system controller after said detecting step;

computer readable program code which causes said programmable computer processor to provide by said local controller to said system controller a data storage device present signal for each of said detected data storage devices.

6. The computer program product of claim 5, wherein said local controller further comprises an RFID reader, and wherein said plurality of data storage devices each comprises an RFID tag encoded with a unique identifier, further comprising:

computer readable program code which causes said programmable computer processor to interrogate said plurality of RFID tags using a radio frequency signal emitted by said RFID reader;

computer readable program code which causes said programmable computer processor to receive a response signal from each of said plurality of data storage devices comprising that device's unique identifier.

* * * * *